(12) United States Patent
Toth et al.

(10) Patent No.: US 6,168,164 B1
(45) Date of Patent: Jan. 2, 2001

(54) HYDRODYNAMIC SEAL AND METHOD OF MANUFACTURE

(75) Inventors: David M. Toth, Brighton; Stanley N. Smith, Farmington, both of MI (US)

(73) Assignee: Federal-Mogul World Wide, Inc., Southfield, MI (US)

( * ) Notice: Under 35 U.S.C. 154(b), the term of this patent shall be extended for 0 days.

(21) Appl. No.: 09/207,132

(22) Filed: Dec. 8, 1998

(51) Int. Cl.[7] .............................. F16J 15/32; B23P 17/00
(52) U.S. Cl. .......................... 277/559; 277/560; 29/417
(58) Field of Search .................... 277/549, 559, 277/560, 570; 29/417, 527.1

(56) References Cited

U.S. PATENT DOCUMENTS

| | | | |
|---|---|---|---|
| 3,376,045 | * | 4/1968 | Jagger . |
| 3,857,156 | * | 12/1974 | Clark . |
| 3,929,341 | * | 12/1975 | Clark ..................... 277/134 |
| 4,174,845 | * | 11/1979 | Hadaway ............... 277/134 |
| 4,208,059 | * | 6/1980 | Fryatt . |
| 4,283,064 | * | 8/1981 | Staab et al. ............ 277/81 |
| 4,451,050 | * | 5/1984 | Repella ................. 277/134 |
| 4,497,496 | * | 2/1985 | Repella ................. 277/134 |
| 4,542,573 | * | 9/1985 | Bainard . |
| 4,568,092 | * | 2/1986 | Hayashida et al. .... 277/152 |
| 4,705,277 | * | 11/1987 | Repella ................. 277/134 |
| 4,723,350 | * | 2/1988 | Kobayashi et al. . |
| 4,739,998 | * | 4/1988 | Steusloff et al. . |
| 4,844,485 | * | 7/1989 | Antonini et al. ...... 277/153 |
| 4,886,281 | * | 12/1989 | Ehrmann et al. ..... 277/47 |
| 5,149,107 | * | 9/1992 | Maringer . |
| 5,209,502 | * | 5/1993 | Savoia ................... 277/152 |
| 5,462,281 | * | 10/1995 | Hering et al. . |
| 5,692,757 | * | 12/1997 | Straub . |
| 5,716,141 | * | 2/1998 | Chen ..................... 384/114 |
| 5,758,881 | * | 6/1998 | Stanley . |
| 5,791,658 | * | 8/1998 | Johnston ............... 277/556 |
| 5,860,656 | * | 1/1999 | Obata et al. .......... 277/559 |

\* cited by examiner

*Primary Examiner*—Anthony Knight
*Assistant Examiner*—Vishal Patel
(74) *Attorney, Agent, or Firm*—Reising, Ethington, Barnes, Kisselle, Learman & McCulloch, P.C.

(57) ABSTRACT

A hydrodynamic shaft seal assembly and method of forming hydrodynamic grooves involves forming a spiraling open channel portion in the face of the seal element, and cutting a flex-enhancing portion extending from the open channel portion further into the seal element to enhance the flexibility of the seal without further enlarging the open channel portion.

16 Claims, 4 Drawing Sheets

HYDRODYNAMIC SEAL AND METHOD OF MANUFACTURE

BACKGROUND OF THE INVENTION

1. Technical Field

This invention relates generally to hydrodynamic seals and more particularly to the formation of the hydrodynamic grooves in such seals.

2. Related Prior Art

Hydrodynamic shaft seals are conventionally made by molding, embossing, or cutting a spiral groove or other hydrodynamic structure or aid into the seal. The hydrodynamic groove interacts with the rotating shaft to pump any lubricating oil that may find its way under the seal back to the oil side of the seal.

Hydrodynamic aids often take the form of a spiraling groove as illustrated, for example, in U.S. Pat. No. 4,739,998, or an open spiraling channel as illustrated, for example, in U. S. Pat. No. 3,857,156. Each of the above hydrodynamic configurations has its advantages and disadvantages.

The spiraling grooves generally extend deeper into the seal than do the open spiraling channels and as such generally increase the flexibility of the seal to a greater extent than do channels. The increased flexibility advantageously decreases the required sealing force that the seal must exert about the shaft to effect a fluid tight seal, thereby decreasing wear and prolonging the life of the seal. The closed nature of such grooves, however, provides less fluid pumping action than an open spiraling channel.

The open spiraling channels have greater fluid pumping capacity due to the relatively larger fluid volume capacity they offer, but generally are less effective at increasing the flexibility of seals. There is an upper limit to the size of such open channels. Making them too large in an effort to increase flexibility can impair the static sealing capabilities and/or lead to excessive hydrodynamic pumping action, both of which are detrimental to the performance of the seal.

It is a principal object of the present invention to provide a hydrodynamic shaft seal having the benefits of both of the mentioned closed groove and open channel hydrodynamic aids without their inherent drawbacks.

SUMMARY OF THE INVENTION

A hydrodynamic shaft seal assembly is provided comprising a carrier, a seal member mounted on the carrier for sealingly engaging a relatively rotatable shaft, and at least one hydrodynamic feature formed on the seal member having a spiraling open channel portion and at least one spiraling flex-enhancing cut extending from the open channel portion into the seal member.

The shaft seal is thus a hybrid of sorts between an open channel-type hydrodynamic seal and a closed groove-type hydrodynamic seal. The open channel portion optimizes hydrodynamic pumping action and minimizes the entrapment of debris while the flex-enhancing cut optimizes seal flexibility without sacrificing the static and hydrodynamic sealing capabilities of the seal.

The invention also provides a method of forming such a hydrodynamic groove in a shaft seal comprising forming the spiraling open channel portion in a face of the shaft seal along with forming the flex-enhancing cut portion extending into the seal from the open channel portion. Shaft seals formed according to the method of the invention share the same advantages discussed above.

BRIEF DESCRIPTION OF THE DRAWINGS

These and other features and advantages of the present invention will become more readily appreciated when considered in connection with the following detailed description and appended drawings, wherein.

DETAILED DESCRIPTION

Figure 1:
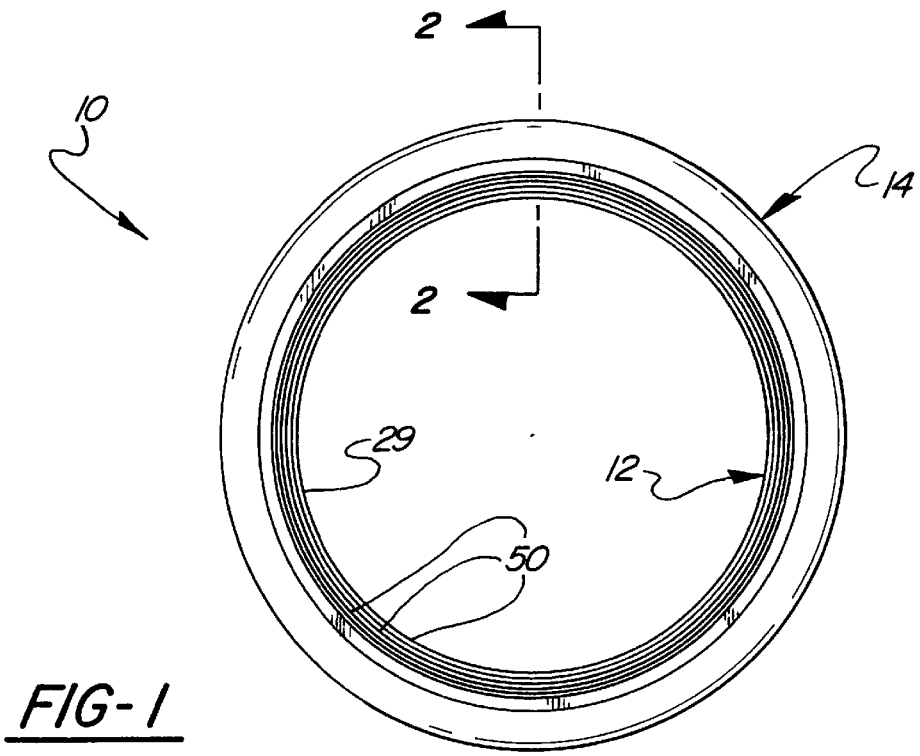
FIG. 1 is an end view of a radial-type shaft seal prepared according to the invention.
Figure 2:
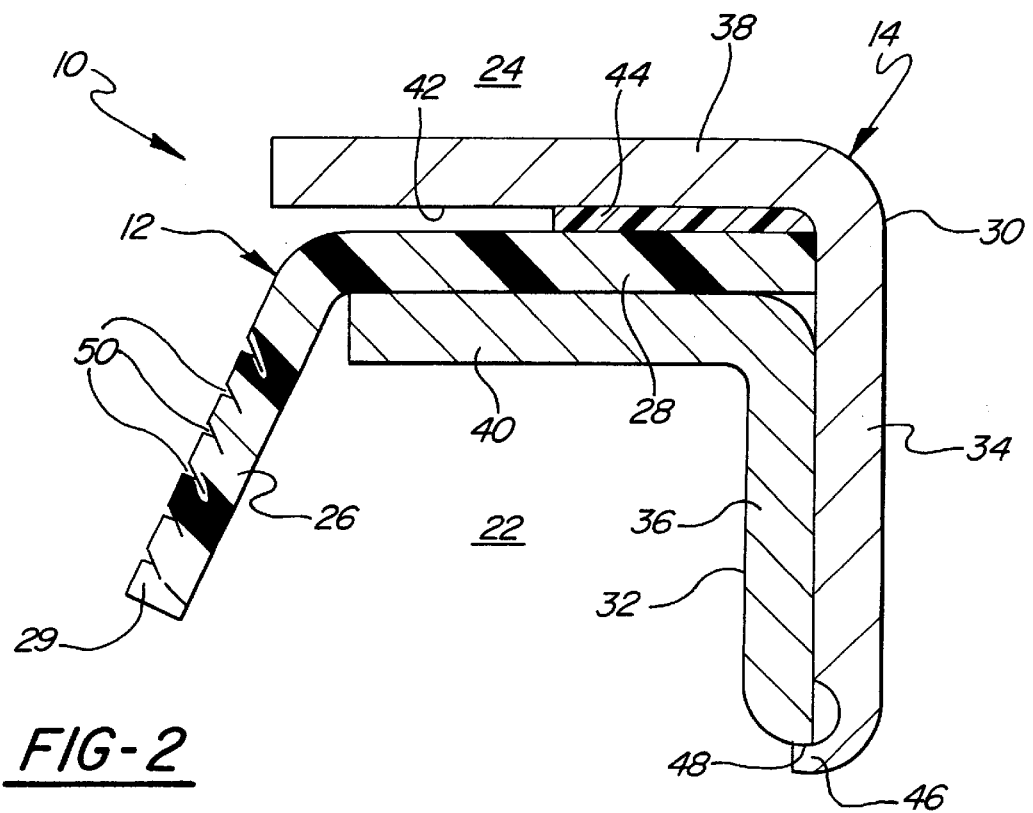
FIG. 2 is an enlarged cross-sectional view taken generally along lines 2—2 of FIG. 1.
Figure 3:
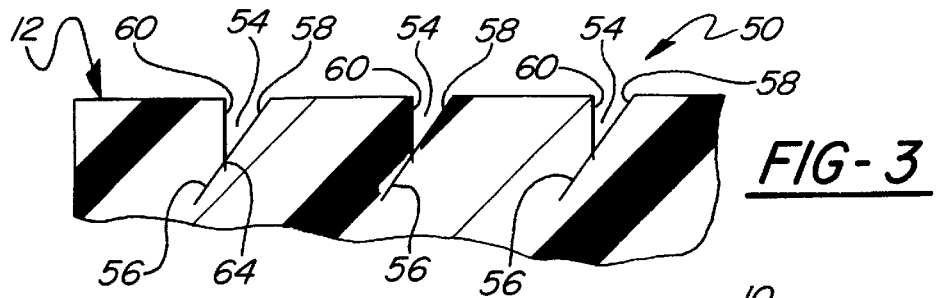
FIG. 3 is an enlarged fragmentary sectional view of the sealing lip portion of the shaft seal showing details of the hydrodynamic feature according to the preferred embodiment of the invention.
Figure 4:
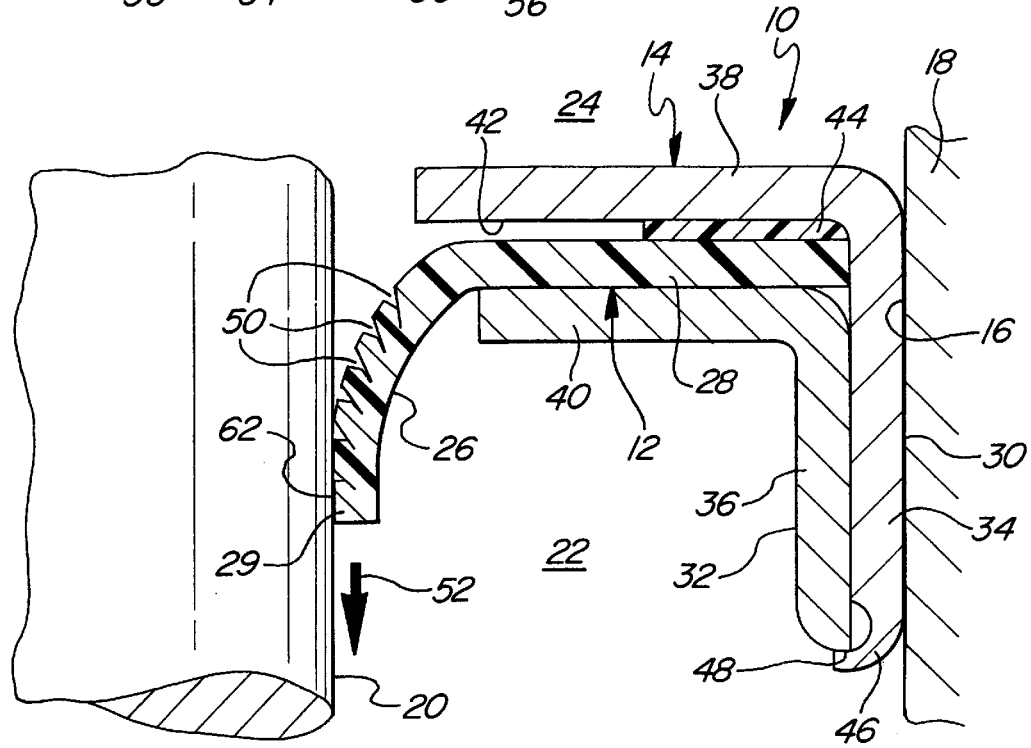
FIG. 4 is a fragmentary cross-sectional view of a seal assembly embodying the present invention shown assembled between a rotating shaft and a stationary bore of a housing.

Referring initially to FIGS. 1, 2, and 4, a hydrodynamic shaft seal assembly constructed according to a presently preferred embodiment of the invention is shown generally at 10 and comprises a seal element mounted in a carrier 14 for installation within a bore 16 of a housing 18 for sealingly engaging a relatively rotatable shaft member 20 in such manner as to contain a fluid, and typically lubricating oil, on an oil side 22 of the seal assembly and to exclude contaminants on an axially opposite, air side 24 of the assembly 10.

The seal element 12 is in the form of a plate or wafer made of a polymer material, and preferably a polytetrafluroethylene (PTFE) compound, which is cut from a tubular billet. Fillers may be added to the wafer material to specifically adapt the wafer for its intended use. Suitable filler materials include glass fibers, molydenum disulfide, graphite and bronze. The seal element 12 includes a radial outer portion 28 fixed to the carrier 14 and a flexible radial inner portion 26 extending radially inwardly of the carrier 14 and terminating in a sealing lip 29 for sealingly engaging the shaft 20. It will be understood that the term "shaft" as used herein includes a rotatable shaft per se as well as a wear sleeve equivalent mountable and rotatable with the shaft in will known manner to provide a sealing surface which may or may not be unitized with the seal assembly 10.

As shown best in FIG. 2, the carrier 14 includes a metallic outer case 30 and a metallic inner case 32 having nested cylindrical body portions 34, 36 terminating at one end in axially spaced annular end flanges 38, 40 extending radially inwardly of the respective body portions 34, 36 and defining an annular gap 42 therebetween in which the radial outer portion 28 of the seal element 12 is disposed. An elastomeric gasket 44 is also disposed within the gap 42 between the end flange 38 of the outer case 30 and the radial outer portion 28 of the seal element 12. The end flange 40 of the inner case 32 is forced toward the end flange 38 of the outer case 30 so that the radial outer portion 28 and the gasket 44 are compressed tightly between the end flanges 38, 40 to fix the seal element 12 securely in the carrier 14 and to prevent leakage of oil past the gasket 44. An end portion 46 of the outer case 30 is curled over a free edge 48 of the inner case 32, serving to lock the case members 30, 32 securely in the compressed condition.

Those skilled in the art will recognize the above described clamping arrangement for securing a sealing element, and particularly one fabricated of polytetrafluoroethylene (PTFE), as being well known. The invention contemplates other carrier constructions and ways of securing the seal element 12 to the carrier 14 such as, for example, bonding rather than clamping the seal element 12 to a carrier 14 which is likewise a known practice in the art as disclosed, for example, in U.S. Pat. No. 5,024,364 commonly owned by the assignee of the present invention and its disclosure incorporated herein by reference.

According to the invention, the radial inner portion 26 of the seal element 12 is formed with hydrodynamic features generally indicated at 50 which operate during relative rotation of the shaft 20 to generate a hydrodynamic pumping action which acts to return any oil which may travel along the shaft 20 to the seal back toward the oil side 22 of the seal assembly 10 in the direction of arrow 52. In this way, any oil that finds its way between the shaft 20 and sealing lip 29 will be returned back to the oil side 22 of the seal assembly 10 by action of the hydrodynamic features 50.

Hydrodynamic features per se are known to the art and are usually in the form of a spiraling open channel or spiraling closed groove.

The hydrodynamic feature 50 according to the present invention is a hybrid of sorts of the open channel and closed groove-type hydrodynamic aids. According to the invention, the seal element 12 is formed with a spiraling open channel notched portion 54 in combination with at least one flex-enhancing spiraling cut portion 56 that extends from the open channel portion 54 into the seal element 12 to lend greater flexibility to the seal element 12. FIGS. 2, 3, 6, and 7 show the seal element 12 in a relaxed or stress-free state prior to installation on the shaft 20. It will be seen that the open channel portion 54 has walls 58, 60 that are spaced from one another at a sealing surface 62 of the seal element 12 and converge or meet inwardly at a root or base 64 of the open channel portion 50 below the surface 62. The open channel portion 54 is preferably generally V-shaped in transverse section, and one wall 60 may be parallel to a longitudinal axis A of the seal member 12, while the other wall 58 is inclined at a predetermined acute angle $\alpha$ with respect to the axis, and preferably in the range of about 25 to 45°. The invention contemplates a construction wherein both walls are inclined to provide an included angle $\alpha$ of, for example, in the range of about 50 to 90°, as illustrated in FIG. 8. As such, the open channel portion 54 is devoid of seal element material, as its walls are spaced. The open channel portion 54 defines a space of pre-determined open volume in which the oil can be collected and redirected through the hydrodynamic pumping action back to the oil side 22 of the seal assembly 10 during operation.

The size and configuration of the open channel portion 54 and cut portion 56 are selected to provide optimum hydrodynamic action and seal flexibility while retaining good static sealing. The invention achieves these objectives through the combination of the open channel and closed cut-type groove portions. Each portion is engineered to meet the needs of a particular application with the above objectives in mind. The seal illustrated in the drawings, for example, is designed for an engine shaft seal application. The size, proportion, and/or geometry of the hydrodynamic portions 54, 56 may be altered to meet the specific needs of a particular application to achieve the desired objectives. Also, a single or multiple lead spiraling combination groove may be employed having the features of the invention.

Figure 6:
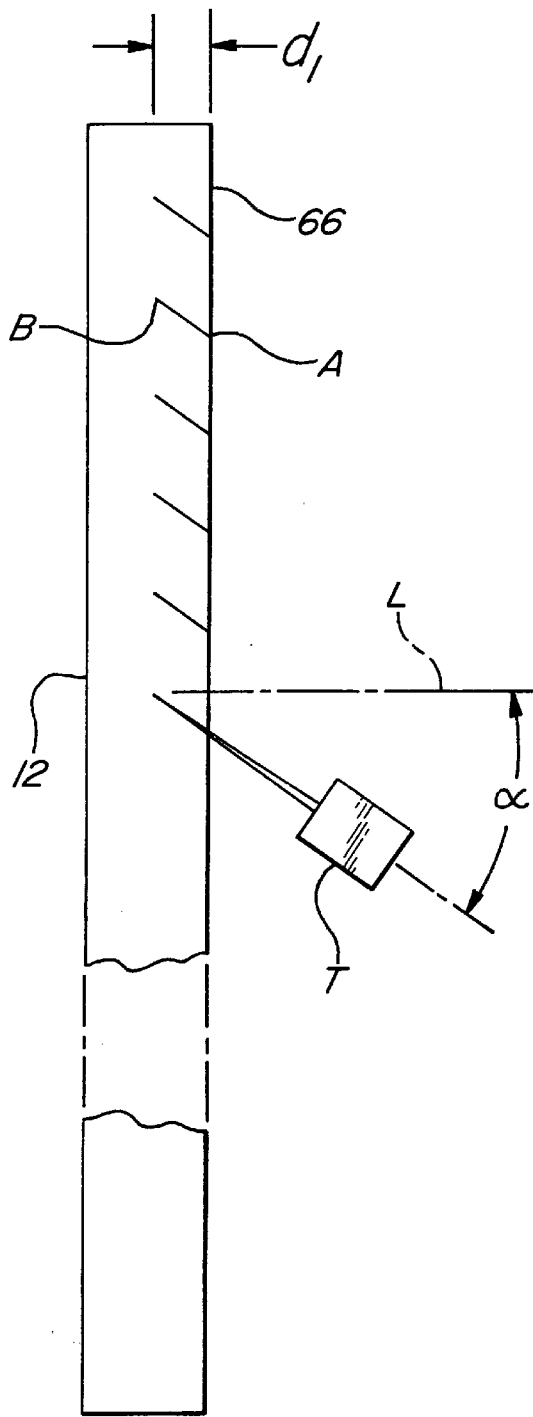
FIGS. 6 and 7 illustrate a preferred method of forming the hydrodynamic features according to the invention.
Figure 7:
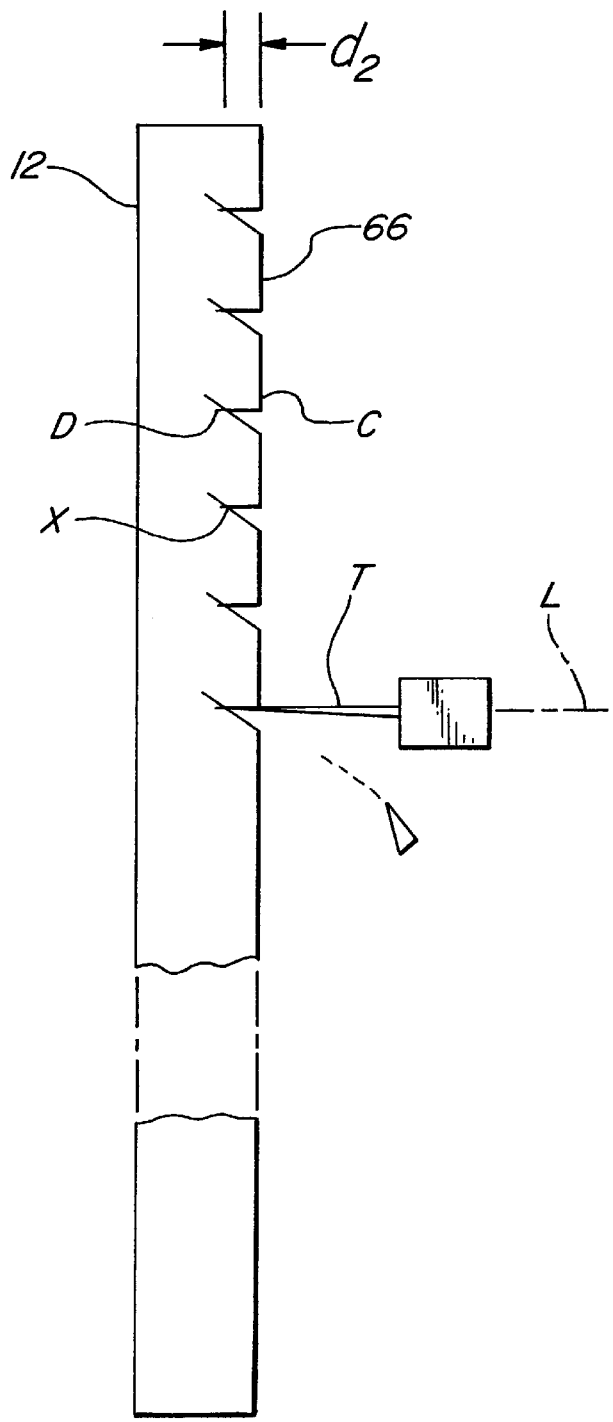
Figure 8:
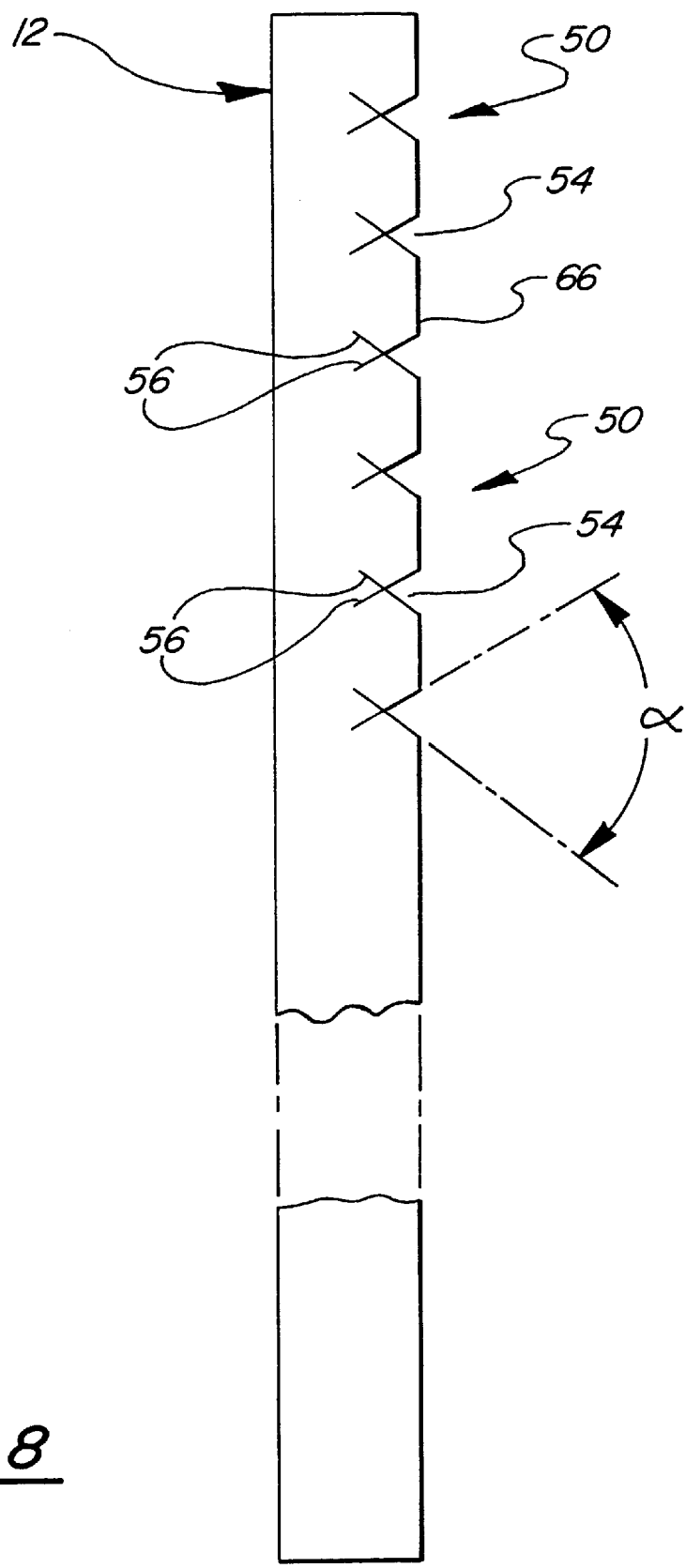
FIG. 8 illustrates an alternative hydrodynamic seal construction.

FIGS. 6 and 7 illustrate a presently preferred method of forming hydrodynamic aids 50 according to the invention to include the open channel and flex-enhancing cut portions 54, 56, respectively. The basic process of forming a PTFE seal member from a tubular billet is disclosed in U.S. Pat. No. 3,857,156, the disclosure of which is incorporated herein by reference. A tubular billet is mounted in a chuck and rotated about its axis with an outer face 66 thereof exposed. A pair of spiraling cross cuts are machined by tool 68 into the face 66 of the seal element 12 to provide the resultant open channel portion 54 and flex-enhancing cut portion 56. The cuts intersect in such manner as to remove material to provide the open channel portion 54 while retaining at least one cut extending beyond the open-channel portion defining the closed flex enhancing cut portion 56.

The other cut is angularly offset with respect to the first cut and extends from a location C on the face 66 that is radially spaced from the location of A of the first cut into the seal in converging relation to the first cut, to a location D which is at or slightly beyond a point of intersection X with the first cut at a location intermediate the ends A, B, of the first cut. The intersecting cut detaches the material necessary to form the open channel portion 54 and leaves a portion intact from the location of intersection X to the base B of the first cut corresponding to the flex-enhancing cut portion 56. As illustrated in FIG. 7, two cut-enhancing cut portions may result. In FIG. 8, the angle of the cuts is greater and criss-cross to provide dual cut-enhancing portions, extending from the open channel portions.

It will be appreciated that cross cutting is but one way to form the open channel portion 54 to provide a spiral channel devoid of the shaft seal material, and is the preferred method. However, those skilled in the art will appreciate that other techniques presently used to form open channel-type grooves could be employed, such as coining, molding, embossing and the like, in combination with a process step to form the cut portion 56 extending from such open channel portion into the seal element 12 to provide the enhanced flexibility.

When the seal 10 is installed, as shown in FIG. 4, there is shaft interference which flexes the radial inner portion 26 axially, causing the lip 29 of the seal element 12 to lie down against the shaft 20 providing a collar-like seal about the shaft 20. As illustrated best in FIGS. 4 and 5, the cut portions 56 open up slightly as the seal is flexed onto the shaft, which has the effect of reducing the radial sealing force that the seal element 12 exerts about the shaft 12 when installed, as compared to a seal without the added cut portion 56. The reduced load beneficially decreases wear on the seal element due to frictional contact and, in doing so, prolongs the operating life of the seal element 12.

Figure 5:
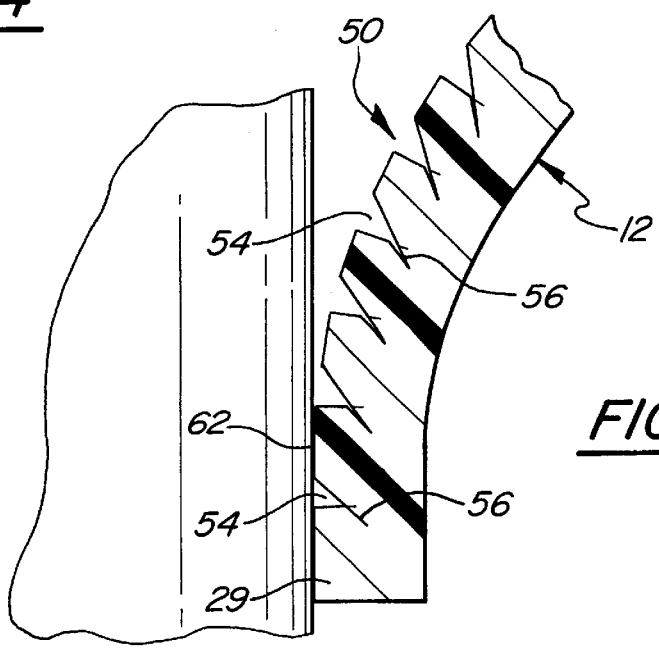
FIG. 5 is an enlarged cross-sectional view of a portion of the sealing lip in the installed condition.

It will also be appreciated from FIGS. 4 and 5 that the flexing caused by the cut portion 56 does not greatly alter the volume or geometry of the cut portion 56, particularly at the location where the lip 29 engages the shaft 20.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A hydrodynamic shaft seat assembly comprising:

a carrier;

a seal member mounted on said carrier having a sealing surface for sealingly engaging a relatively rotatable shaft; and at least one hydrodynamic groove formed on said seal member having an open channel notched portion devoid of seal member material at said sealing surface provided by angularly opposed walls of said groove spaced at said sealing surface and converging at a location below said sealing surface when the seal is in a relaxed condition and at least one flex-enhancing cut portion extending from said open channel portion into said seal member to increase the flexibility of said seal member.

2. The shaft seal assembly of claim 1 wherein said opposite walls of said channel portion converge at a root of said open channel portion and said cut portion extends from said walls of said open channel portion.

3. The shaft seal assembly of claim 2 wherein at least one of said walls is set at a predetermined angle relative to a longitudinal axis of said seal member.

4. The shaft seal of claim 3 wherein one of said walls is parallel to said longitudinal axis.

5. The shaft seal assembly of claim 4 wherein the other of said walls is set at an angle in the range of about 25–45° relative to said axis.

6. The shaft seal assembly of claim 3 wherein both of said walls are set at an angle relative to said longitudinal axis.

7. The shaft seal assembly of claim 2 wherein said cut portion comprises a cut extension of one of said walls of said open channel portion.

8. The shaft seal assembly of claim 7 wherein said cut portion is set at a predetermined angle relative to a longitudinal axis of said seal member.

9. The shaft seal assembly of claim 1 wherein said open channel portion extends a predetermined first axial distance into said seal member and said cut portion extends a predetermined second axial distance into said seal member relatively greater than that of said first distance.

10. The shaft seal assembly of claim 1 wherein said hydrodynamic groove is formed by machining spiral cuts into the sealing surface of the seal member with a first of the cuts intersecting and extending beyond another of the cuts so as to remove seal member material at said seal surface corresponding to said open channel portion and to provide a remaining cut extending from said open channel portion further into said seal member to define said flex-enhancing cut portion.

11. The shaft seal assembly of claim 1 wherein said hydrodynamic groove is cut into said seal member and includes one cut extending a predetermined depth into said seal member from a sealing surface of said seal member and terminating within said seal member at a root thereof, and another cut of lesser depth transverse to and intersecting said one cut between said sealing surface and said root of said one cut.

12. A shaft seal assembly comprising:

a carrier;

a seal member fabricated of PTFE material mounted on said carrier and having a shaft-engaging seal surface; and at least one hydrodynamic feature machined into said shaft-engaging sealing surface, including a spiraling open channel notched portion devoid of seal member material at said sealing surface when said seal member is in a relaxed state and a flex-enhancing cut portion extending from the open channel portion into the seal member.

13. A method of forming a spiraling hydrodynamic feature in a shaft seal, comprising:

forming a spiraling open channel notched portion in a face of the seal that is devoid of seal material at said face when the seal is in a relaxed condition; and cutting a spiraling flex-enhancing cut portion into the seal extending from the open channel portion.

14. The method of claim 13 wherein said open channel portion is formed by cutting the seal member.

15. The method of claim 13 wherein the open channel portion is formed by removing material of the seal and the cut portion is formed by machining a cut from the open channel portion into the seal.

16. The method of claim 15 including forming the seal member from PTFE.

* * * * *

UNITED STATES PATENT AND TRADEMARK OFFICE
CERTIFICATE OF CORRECTION

PATENT NO. : 6,168,164
DATED      : January 2, 2001
INVENTOR(S): David M. Toth et al It is certified that error appears in the above-identified patent and that said Letters Patent is hereby corrected as shown below:

ON THE TITLE PAGE

Section [56] References Cited, change "5,462,281" to -- 5,462,287 --.

Column 4, line 61, change "seat" to -- seal --.

Signed and Sealed this

Twenty-ninth Day of May, 2001

Attest:

NICHOLAS P. GODICI

*Attesting Officer*     *Acting Director of the United States Patent and Trademark Office*